(12) United States Patent
White et al.

(10) Patent No.: US 10,179,503 B2
(45) Date of Patent: Jan. 15, 2019

(54) TONNEAU COVER AND DIVIDER PANEL SYSTEM

(71) Applicant: Ford Global Technologies, LLC, Dearborn, MI (US)

(72) Inventors: Kendra White, Redford, MI (US); Pattrick Loew, Dearborn, MI (US); Eric Rinke, Plymouth, MI (US); Kyle Ness, Royal Oak, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/623,642

(22) Filed: Jun. 15, 2017

(65) Prior Publication Data

US 2018/0361839 A1  Dec. 20, 2018

(51) Int. Cl.
*B60J 7/14* (2006.01)
*B60P 7/02* (2006.01)

(52) U.S. Cl.
CPC .............. *B60J 7/141* (2013.01); *B60P 7/02* (2013.01)

(58) Field of Classification Search
CPC ..................................... B60J 7/141; B60P 7/02
USPC ........................................ 296/100.06, 100.09
See application file for complete search history.

(56) References Cited

U.S. PATENT DOCUMENTS

| 5,265,993 | A | 11/1993 | Wayne | |
|---|---|---|---|---|
| 6,039,379 | A | 3/2000 | Jordan | |
| 6,183,035 | B1* | 2/2001 | Rusu | B60J 7/1621 296/100.01 |
| 6,217,103 | B1 | 4/2001 | Schultz et al. | |
| 6,264,266 | B1* | 7/2001 | Rusu | B60J 7/1621 296/100.06 |
| 6,536,826 | B1* | 3/2003 | Reed | B60P 3/42 224/404 |
| 6,561,561 | B2* | 5/2003 | Getzschman | B60R 9/00 224/404 |
| 6,986,541 | B1 | 1/2006 | Haack | |
| 7,631,919 | B2 | 12/2009 | Schrader | |
| 2002/0101088 | A1* | 8/2002 | Rigau | B60R 11/06 296/37.6 |
| 2003/0184115 | A1* | 10/2003 | Armstrong | B60J 7/08 296/100.06 |
| 2010/0127529 | A1* | 5/2010 | Elliott | B60J 7/141 296/100.09 |
| 2016/0152194 | A1* | 6/2016 | Kim | B60R 13/01 296/37.5 |
| 2017/0015254 | A1* | 1/2017 | Wilson | B60R 9/065 |
| 2018/0086277 | A1* | 3/2018 | Wilson | B60R 9/065 |

* cited by examiner

*Primary Examiner* — Gregory A Blankenship
(74) *Attorney, Agent, or Firm* — Carlson, Gaskey & Olds, P.C.

(57) ABSTRACT

A cover and divider system for a cargo bed of a vehicle includes a plurality of connected cover portions securable over a cargo bed and at least one panel securable to underside of each of the plurality of cover portions in a stored condition and removable from the corresponding one of the plurality of cover portions to partition the cargo bed.

18 Claims, 6 Drawing Sheets

TONNEAU COVER AND DIVIDER PANEL SYSTEM

TECHNICAL FIELD

This disclosure relates to a cover and divider panel system for a pickup truck cargo bed.

BACKGROUND

Vehicles such as pickup trucks, for example, include a cargo bed that is used to transport items large and small. The cargo bed area is a large open space and therefore smaller items tend to move around while driving. Cargo bed dividers may be used to keep smaller items in place while driving. While the dividers are advantageous when only a small part of the cargo bed is needed, when the entire cargo bed is needed, or nothing is being transported, the dividers become another item to store. The dividers are either stored within the cargo bed or outside the pickup truck. Leaving the dividers within the cargo bed limits available unobstructed continuous space. Removal of the dividers from the cargo bed requires an outside storage space and may result in the dividers not being available at all times.

SUMMARY

An apparatus according to an exemplary aspect of the present disclosure includes, among other things, a cover system including a holder for securing at least one panel to an underside of the cover, the holder removably securing the at least one panel such that the at least one panel is removable from the cover for partitioning the cargo bed independent of the cover.

In a further non-limiting embodiment of the foregoing cover system, the holder includes a snap-fit compartment on the underside of the cover for storing the at least one panel.

In a further non-limiting embodiment of the foregoing cover system, the holder comprises a latch movable between a secured position holding the at least one panel to the underside of the cover and a non-secured position enabling removal of the at least one panel from the cover.

In a further non-limiting embodiment of the foregoing cover system, the cover comprises at least two cover portions moveably secured to each other and at least one panel is secured to each of the at least two cover portions.

In a further non-limiting embodiment of any of the foregoing cover systems, the at least two cover portions are secured together by a flexible member.

In a further non-limiting embodiment of any of the foregoing cover systems, the at least two cover portions are secured together by a hinge.

In a further non-limiting embodiment of any of the foregoing cover systems, panel holders are mounted within the cargo bed for holding the at least one panel upright to partition the cargo bed.

In a further non-limiting embodiment of any of the foregoing cover systems, panel holders are removably mounted within the cargo bed for holding the at least one panel upright to partition the cargo bed.

In a further non-limiting embodiment of any of the foregoing cover systems, the at least one panel includes interlocking features for holding another panel in a desired position within the cargo bed independent of the cover.

An apparatus according to another exemplary aspect of the present disclosure includes, among other things, a cover and divider panel system for a cargo bed of a vehicle including a plurality of connected cover portions securable over a cargo bed and at least one panel securable to an underside of each of the plurality of cover portions in a stored condition and removable from the corresponding one of the plurality of cover portions to partition the cargo bed.

In a further non-limiting embodiment of any of the foregoing cover systems, each of the cover portions includes a snap-fit compartment into which the at least one panel is secured.

In a further non-limiting embodiment of any of the foregoing cover systems, each of the cover portions includes a latch movable between a secured position holding the at least one panel to the underside of the cover and a non-secured position enabling removal of the at least one panel from the cover.

In a further non-limiting embodiment of any of the foregoing cover systems, the at least one panel includes an interlocking feature for holding another panel in an upright position within the cargo bed independent of structures mounted to side walls of the cargo bed.

In a further non-limiting embodiment of any of the foregoing cover systems, a panel holder on side walls of the cargo bed holds the at least one panel in an upright position independent of the cover.

A method of covering and partitioning a cargo bed according to an exemplary aspect of the present disclosure includes, among other things the steps of defining a holder on an underside of a cargo bed cover, securing the cover over the cargo bed, securing the at least one panel with the holder to the underside of the cover, and removing the partition from the cover to partition the cargo bed independent of the cover.

In a further non-limiting embodiment of the foregoing method, the cover comprises at least two cover portions that are connected to each other and the method further comprises securing at least one panel to each of the at least two cover portions.

In a further non-limiting embodiment of any of the forgoing methods, wherein defining the holder comprises defining a snap-fit compartment on an underside of the cargo bed cover for the at least one panel.

In a further non-limiting embodiment of any of the forgoing methods, wherein defining the holder comprises defining a latch movable between a secured position holding the at least one panel to the underside of the cover and a non-secured position enabling removal of the at least one panel from the cover.

In a further non-limiting embodiment of any of the forgoing methods, including removing the panels from each of the at least two cover portions and securing the panels within the cargo bed independent of the at least two cover portions.

In a further non-limiting embodiment of any of the forgoing methods, including securing two panels across the cargo bed and another panel between the two panels disposed across the cargo bed.

The various features and advantages of this disclosure will become apparent to those skilled in the art from the following detailed description. The drawings that accompany the detailed description can be briefly described as follows.

DETAILED DESCRIPTION

This disclosure details an exemplary apparatus and method for using and storing divider panels to partition a cargo bed of a vehicle. These and other features are discussed in greater detail in the following paragraphs of this detailed description.

Figure 1:
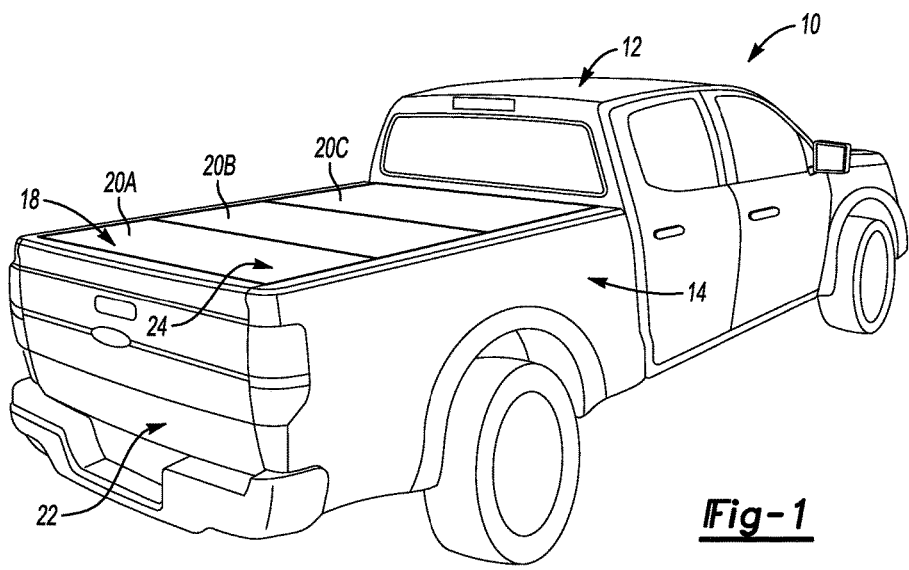
FIG. 1 is a schematic view of a motor vehicle including an example cargo bed cover.

FIG. 1 shows a pick-up truck 10 having a cargo bed 14 disposed to the rear of the vehicle cab 12. A tailgate 22 provides access to the cargo bed 14 at the rear of the vehicle 10. A cargo bed cover system 18 is included to cover the cargo bed 14 and is removable to enable access. The example cover system 18 includes three cover portions 20A-C that are independently movable to enable partial access the cargo bed 14.

Figure 2:
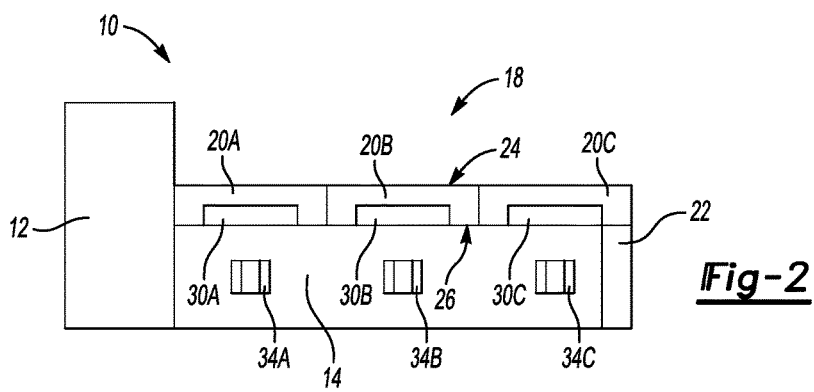
FIG. 2 is a schematic view of an example cargo bed cover system.
Figure 3:
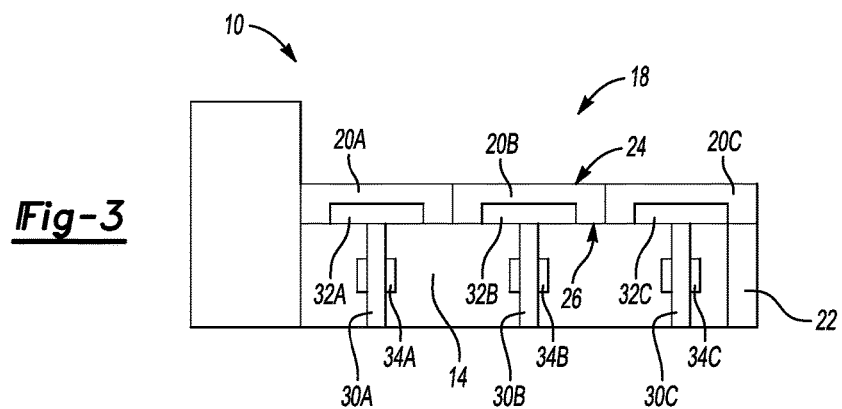
FIG. 3 is a schematic view of the example cargo bed cover system with divider panels removed from the cover and installed in the cargo bed.

Referring to FIGS. 2 and 3 with continued reference to FIG. 1, the example cover system 18 includes the cover portions 20A-C that each include a compartment 32A-C (FIG. 3) for storage of divider panels 30A-C. The divider panels 30A-C are removable from the compartments 32A-C and are used to partition the cargo bed 14 to better hold transported objects. Each of the divider panels 30A-C are separable from the corresponding cover portion 20A-C. The cargo bed 14 includes panel holders 34A-C to support one of the divider panels 30A-C in place across the cargo bed 14 independent of the cover 18 and any of the cover portions 20A-C.

Referring to FIG. 3 with continued reference to FIG. 2, the example cover 18 is shown with the divider panels 30A-C removed from the compartments 32A-C and mounted within the cargo bed 14. The divider panels 30A-C are held in place by the corresponding holders 34A-C. The divider panels 30A-C are separable from each of the corresponding cover portions 20A-C and independently held in place within the cargo bed 14 separate from the cover 18.

The example cover 18 is fabricated from a material defining a top side 24 that is adapted for exposure to the elements and a bottom side 26 that includes the compartments 32A-C for storage of the divider panels 30A-C. The example cover 18 is secured to the vehicle 10 across the cargo bed 14 and is formed from a hard plastic material. The plastic material may comprise any material that has sufficient strength and mechanical properties desired to maintain a desired shape while also defining compartments 32A-C for holding divider panels 30A-C.

Figure 4:
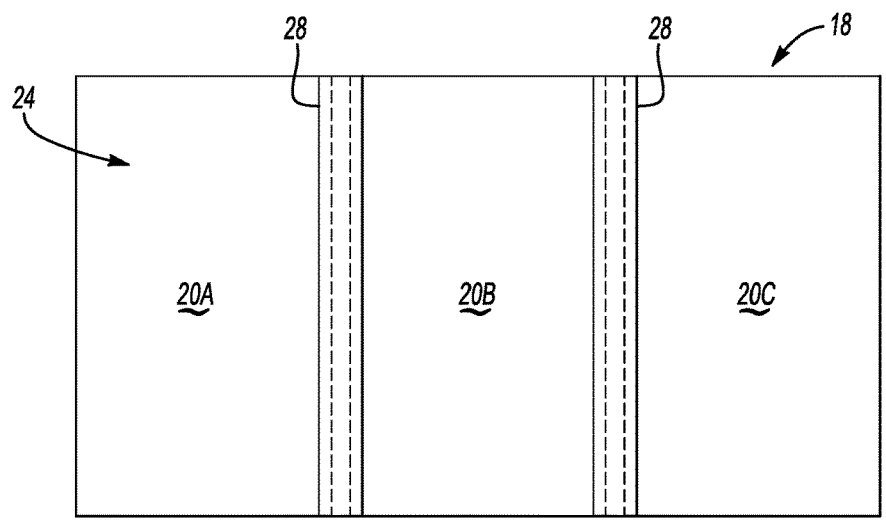
FIG. 4 is a top view of the example cargo bed cover system.
Figure 5:
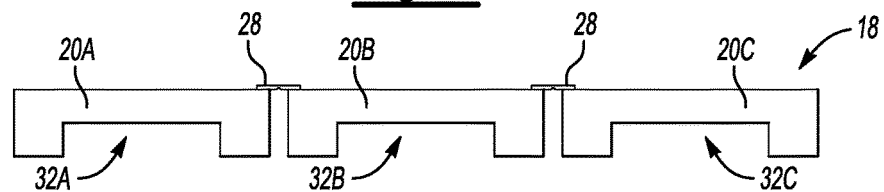
FIG. 5 is a sectional view of an example cargo bed cover system embodiment.

Referring to FIGS. 4 and 5, the top side 24 of the example cover 18 includes the individual cover portions 20A-C. The cover portions 20A-C are movably attached to one another by way of a flexible portions 28. In this example, the flexible portions 28 comprises a living hinge that extends between cover portions 20A-C to enable one of the cover portions to be movable or lifted up relative to the other cover portions 20A-C. The flexible portion 28 is a thin connecting member that provides sufficient flexibility to enable lifting up of one cover portion 20A-C relative to the other cover portions 20A-C.

Figure 6:
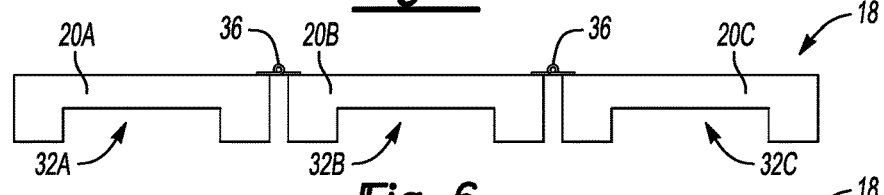
FIG. 6 is a sectional view of another example cargo bed cover system embodiment.

Referring to FIG. 6 with continued reference to FIG. 4, another example of a connection between the cover portions 20A-C is shown. In the example cover 18 shown in FIG. 5, a mechanical hinge 36 is provided between each of the cover portions 20A-C. The hinge 36 is attached between cover portions 20A-C and enables lifting of one of the cover portions 20A-C relative to the other cover portions 20A-C. Lifting of the cover portions 20A-C provides access to the cargo bed 14 and also to the divider panels 30A-C secured to the underside 26 of the cover 18. The mechanical hinge 36 may be integrally formed as part of the cover portions 20A-C. The mechanical hinge 36 may also be a separate part attached to the cover portions 20A-C. It should be understood, that other structures and means for connecting the cover portions 20A-C as are known that provide for lifting of each cover portion 20A-C are within the contemplation of this disclosure.

Figure 7:
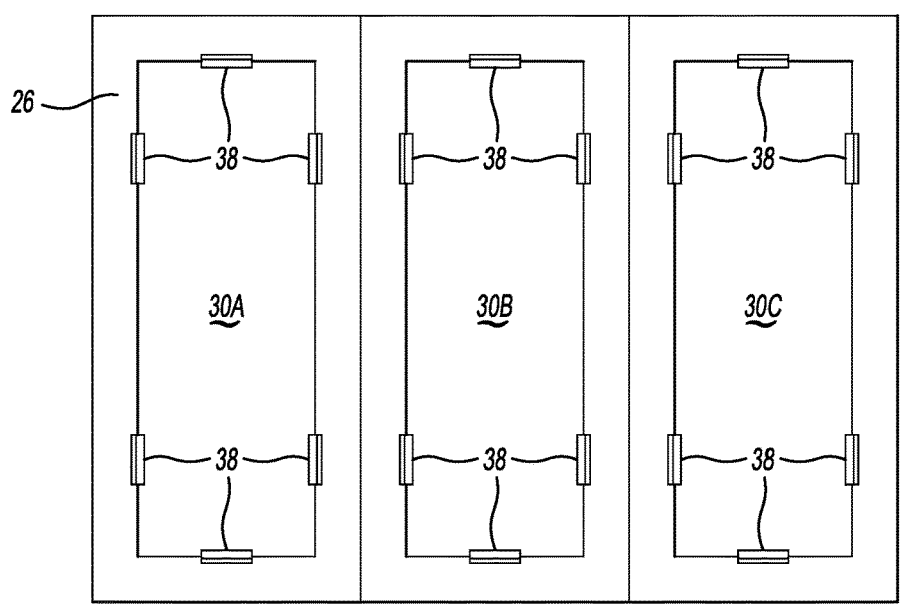
FIG. 7 is a schematic view of an underside of the example cargo bed cover system.

Referring to FIG. 7, the underside 26 of the cover portions 20A-C are shown with divider panels 30A-C held in place within the compartment 34A-C. Each of the compartments 32A-C in this disclosed embodiment are integrally formed within the corresponding cover portion 20A-C. The compartments 32A-C define a space for holding each of the divider panels 30A-C above the cargo bed 14. The divider panels 30A-C are held in place by features 38 of formed or mounted proximate the compartments 32A-C.

Figure 8:
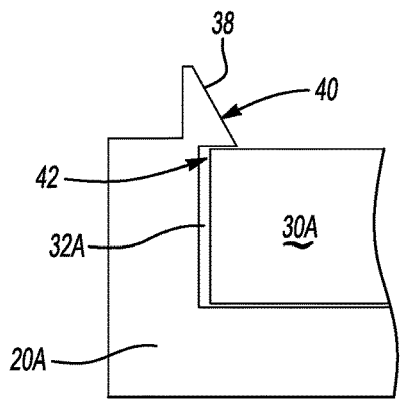
FIG. 8 is a schematic view of a portion of an example compartment within the cargo bed cover.

Referring to FIG. 8 with continued reference to FIG. 7, a portion of one example compartment 32A is shown and the feature comprises a snap fit 38 that holds the divider panel 30A within the cover portion 20A. The snap fit 38 includes a ramp portion 40 and a catch portion 42. The ramp portion 40 guides the panel 30A into the compartment 32A. The snap fit 38 may bend outward so that the panel 30A may be received within the compartment 32A. The catch 42 maintains the panel 30A in place within the compartment 32A. The catch 42 and snap fit 38 are configured such that the panel 30A may be pulled free of the compartment 32A with the application of a predetermined amount of force but may not fall free on its own.

Figure 9A:
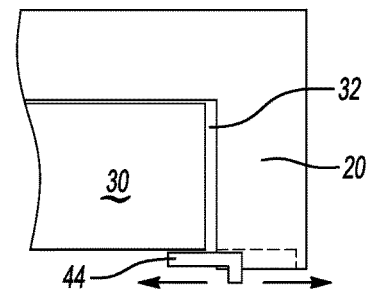
FIG. 9A is a schematic view of a portion of another example compartment embodiment of the cover system including a latch in a secured position.
Figure 9B:
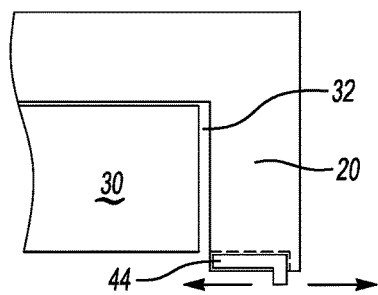
FIG. 9B is a schematic view of the example compartment shown in FIG. 9A with the latch in a non-secured position.

Referring to FIGS. 9A and 9B, another example compartment 32 is shown and includes a latch 44 that is movable from a secured position illustrated in FIG. 9A to a non-secured position illustrated in FIG. 9B. In this disclosed example, the latch 44 is movably supported within the cover portion 20 proximate to the compartment 32. The panel 30 is placed within the compartment 32 and the latch 44 is moved to the secured position as is illustrated in FIG. 9A. When it is desired to remove the panel 30 from the cover 20, the latch 44 is moved to the non-secured position illustrated in FIG. 9B. With the latch 44 in the non-secured position, the panel 30 may be freely removed from the compartment 32.

Figure 10A:
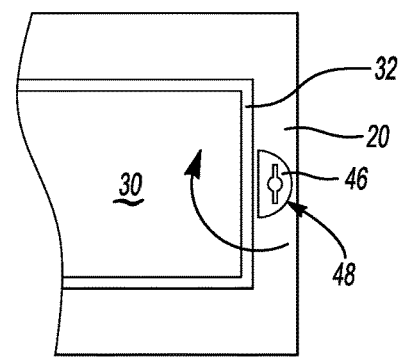
FIG. 10A is a schematic view of another example compartment embodiment with a latch in a non-secured position.
Figure 10B:
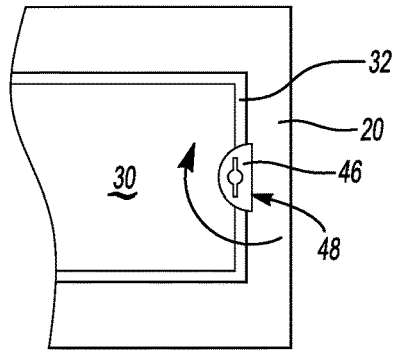
FIG. 10B is a schematic view of the example compartment shown in FIG. 10A with the latch in a secured position.

Referring to FIGS. 10A and 10B, the underside 26 of one cover portion 20A-C is shown and includes another example latch 46 that is rotatable about an axis 48 between a non-secured position and a secured position. In this example, the panel 30 is placed within the compartment 32 defined within the cover 20. The latch 46 is rotated about the axis 48 such that it extends across the space of the compartment 32 as is illustrated in FIG. 10B. In the position of the latch 46 shown in FIG. 10b, the panel 30 is held within the compartment 32. Rotation of the latch 46 to the position shown in FIG. 10A releases the panel 30 from the compartment 32.

The latches disclosed schematically in FIGS. 9A, 9B, 10A and 10B are examples of possible latch configurations. Other latch configurations and mechanisms as are known are within the contemplation of this disclosure.

Figure 11A:
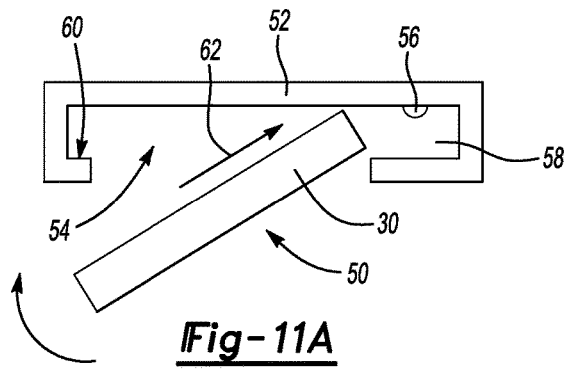
FIG. 11A is a schematic view of a divider panel being inserted into another example compartment of the cargo bed cover system.
Figure 11B:
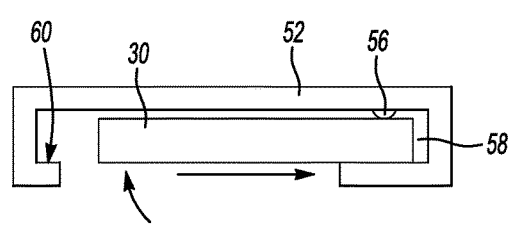
FIG. 11B is a schematic view of the divider panel being further inserted into the compartment of the cargo bed cover system.
Figure 11C:
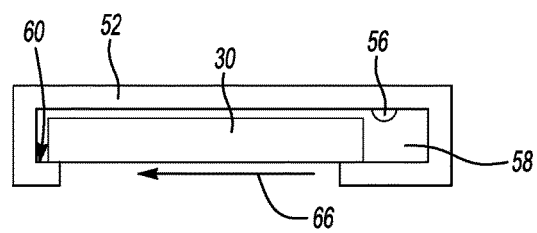
FIG. 11C is a schematic view of the divider panel being moved to a secured position within the compartment of the cargo bed cover system.

Referring to FIGS. 11A, 11B and 11C, another example cover 50 includes cover portion 52 with a compartment 54 for storing a divider panel 30. Storage of the panel 30 within the compartment 54 is provided by moving the panel 30 into an open portion 58 in the direction indicated by arrow 62 shown in FIG. 11A to clear a catch 60 on an opposite end. The open portion 58 includes a stop 56 over which the panel 30 is inserted.

The panel 30 is than rotated into the compartment 54 as is illustrated in FIG. 11B and moved into the open portion 58 as indicated by arrow 64. In the position illustrated in FIG. 11B, the panel 30 may still fall from the compartment 54. Accordingly, the panel 30 is moved rearward towards the catch 60 in the direction indicated by arrow 66. The panel 30 is moved back against the back wall of the compartment under the catch 60. In this position, the panel 30 is supported at both ends and the stop 56 prevents the panel 30 from moving forward and dislodging from the cavity 54. The example compartment 54 within the cover portion 52 illustrated in FIGS. 11A, B and C provides a simple and effective means of storing a divider panel 30 within the cover 50 without additional mechanisms.

Figure 12:
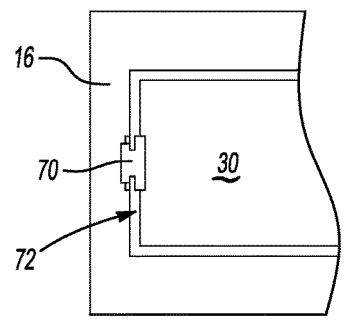
FIG. 12 is a sectional view of a portion of the cargo bed including an example holder for a divider panel.
Figure 13:
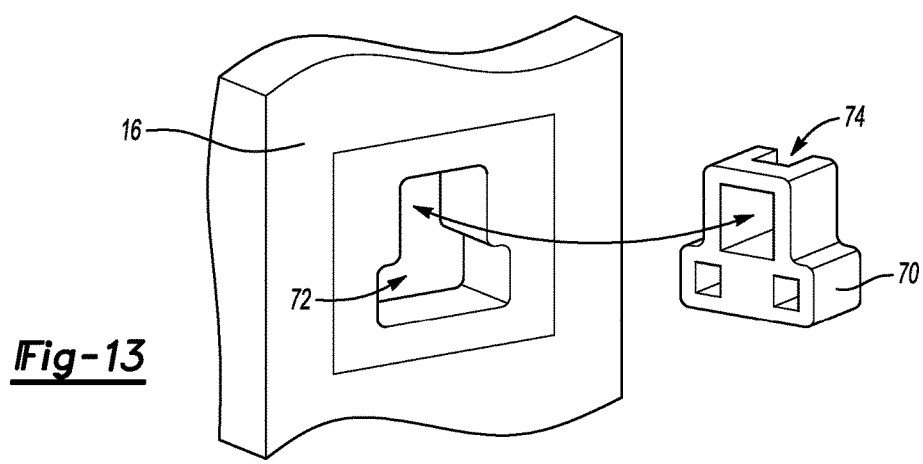
FIG. 13 is a schematic view of an example holder and mount within the cargo bed.

Referring to FIGS. 12 and 13, an example divider holder 70 is illustrated that is installed to a side wall 16 of the cargo bed 14. The example holder 70 includes features that engage a mounting opening 72 defined within the side wall 16.

Several of these holders 70 are arranged within the cargo bed 14 to hold divider panels 30 in an upright position independent of any of the cover portions 20A-C. The mounting opening 72 is provided within the side wall 16 of the cargo bed 14 and is adaptable for receiving other modular structures to provide other storage and securement options. In this example, the holder 70 is configured to include channels 74 that receive and hold the divider panel 30 upright within the cargo bed 14 independent of the cover 18.

Figure 14:
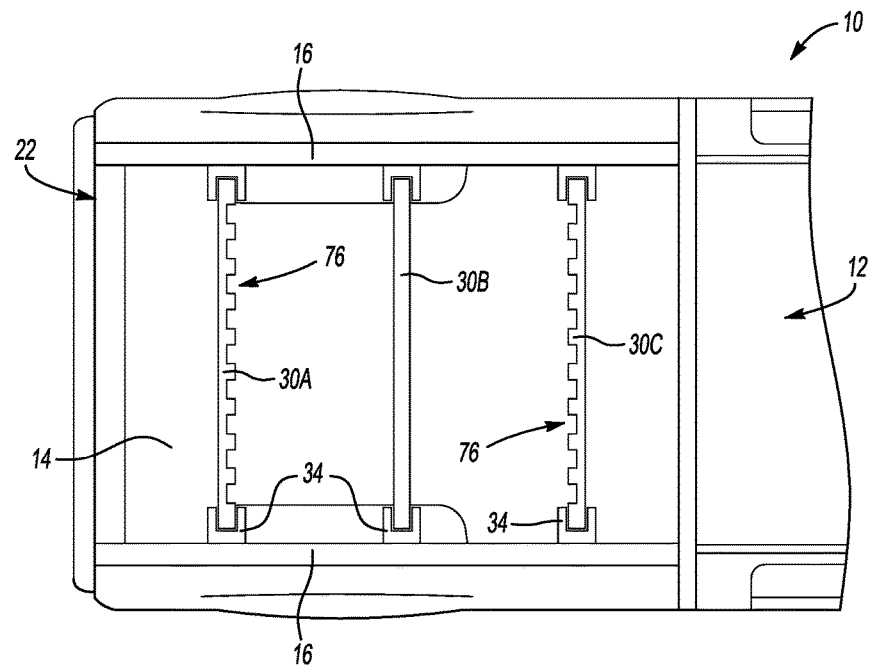
FIG. 14 is a top view of the example divider panels installed to partition the cargo bed in one example orientation.

Referring to FIG. 14, the divider panels 30a, 30b and 30c are shown partitioning the cargo bed 14. Holders 34 mounted within the cargo bed 14 hold the divider panels 30A-C between the side walls 16. In this example, at least two of the panels 30a, and 30c include interlocking features 76 that enable optional assembly of a third one of the panels 30b between the panels 30a and 30c.

Figure 15:
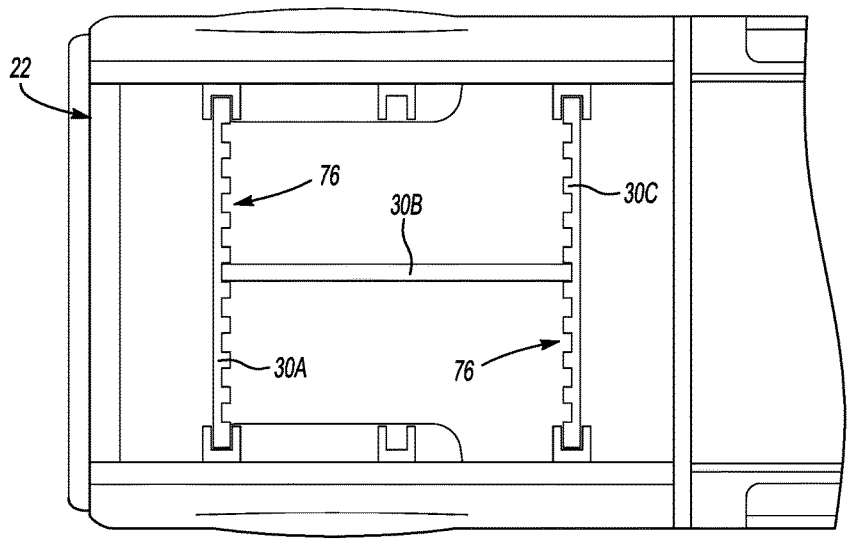
FIG. 15 is another top view of the divider panels installed to partition the cargo bed according to another example orientation.

Referring to FIG. 15, the panel 30b is shown extending between the panel 30a and panel 30c. The panels 30a and 30c are held in place by the holders 34 while the divider panel 30b is held between the panels 30a and 30c. Interlocking features 76 enable the divider panel 30b to be moved to define the partition area needed to confine objects supported and transported within the cargo bed 14.

Figure 16:
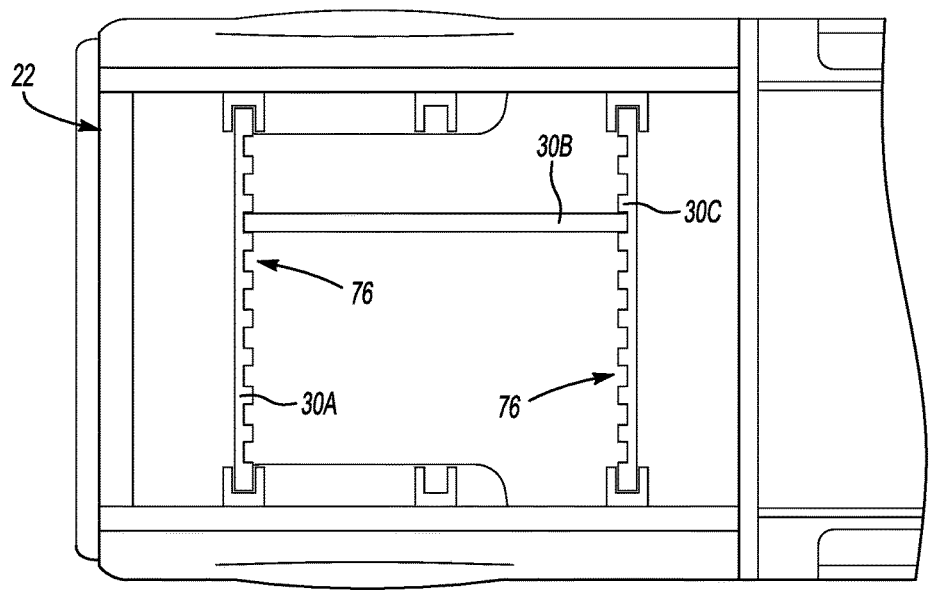
FIG. 16 is yet another top view of the divider panels installed to partition the cargo bed according to another example orientation.

Referring to FIG. 16 with continued reference to FIGS. 14 and 15, the example panel 30b is shown in another position perpendicular to the panels 30a and 30c that are held within holders 34 disposed within the side walls 16 of the cargo bed 14. In this position, the panel 30b is disposed with an interlocking feature 76 defined within each of the panels 30A-C. In the disclosed example embodiment shown in FIGS. 14, 15 and 16, only two of the panels 30a, 30c are shown with interlocking features 76. However, each of the panels 30A-C may include interlocking features such that one standard divider panel may be utilized and provided with the example cover system 18.

Figure 17:
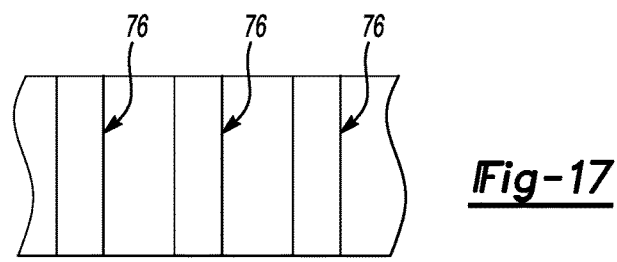
FIG. 17 is a schematic view of interlocking features of the divider panels according to one example embodiment.

Referring to FIG. 17, the example interlocking feature 76 includes channels that extend the width of the divider panel 30A-C between a bottom and top surface. The channels are of a width that accepts the thickness of another one of the divider panels 30A-C.

Figure 18:
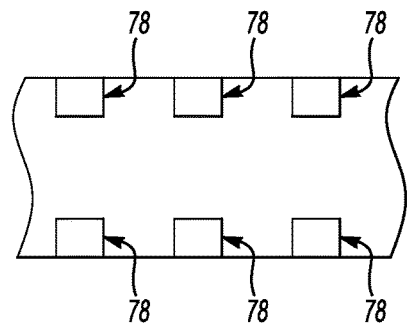
FIG. 18 is schematic view of interlocking features of the divider panels according to another example embodiment.

Referring to FIG. 18, another example of the interlocking features 78 on the divider panels 30A-C are discontinuous meaning that they are disposed at a top, bottom or other location on the panel 30A-C instead of extending uninterrupted between a top and bottom portion of each of the panels 30A-C.

Accordingly, the example cover 18 provides compartments 32 for storage of divider panels 30 that are removable and installable to partition the cargo bed 14 independent of the cover 18. Moreover, the example divider panels includes features that enable various configurations of partitioning the cargo bed including assembly of divider panels using interlocking features of the divider panels themselves.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A cover system for a cargo bed, comprising:
a cover including at least two cover portions moveably secured to each other, each of the at least two cover portions including a holder for securing a panel to an underside of each of the least two cover portions, the holder removably securing the panel such that the panel is removable from each of the cover portions for partitioning the cargo bed independent of the cover.

2. The cover system according to claim 1, wherein the holder comprises a snap-fit compartment on the underside of each of the cover portions for storing the panel.

3. The cover system according to claim 2, wherein the holder comprises a latch movable between a secured position holding the panel to the underside of one of the at least two cover portions and a non-secured position enabling removal of the panel from the cover portion.

4. The cover system according to claim 1, wherein the at least two cover portions are secured together by a flexible member.

5. The cover system according to claim 1, wherein the at least two cover portions are secured together by a hinge.

6. The cover system according to claim 1, including panel holders mounted within the cargo bed for holding the panel upright to partition the cargo bed.

7. The cover system according to claim 1, including panel holders removably mounted within the cargo bed for holding the panel upright to partition the cargo bed.

8. The cover system according to claim 1, wherein the panel includes interlocking features for holding another panel in a desired position within the cargo bed independent of the cover.

9. A cover and divider panel system for a cargo bed of a vehicle comprising:
a plurality of connected cover portions securable over a cargo bed;
at least one panel securable to an underside of each of the plurality of cover portions in a stored condition and removable from the corresponding one of the plurality of cover portions to partition the cargo bed.

10. The cover and divider panel system according to claim 9, wherein each of the cover portions includes a snap-fit compartment into which the at least one panel is secured.

11. The cover and divider panel system according to claim 9, wherein each of the cover portions includes a latch movable between a secured position holding the at least one panel to the underside of the cover and a non-secured position enabling removal of the at least one panel from the cover.

12. The cover and divider panel system according to claim 11, wherein the at least one panel includes an interlocking feature for holding another panel in an upright position within the cargo bed independent of structures mounted to side walls of the cargo bed.

13. The cover and divider panel system according to claim 11, including a panel holder on side walls of the cargo bed for holding the at least one panel in an upright position independent of the cover.

14. A method of covering and partitioning a cargo bed comprising;
defining a holder on an underside of at least two cover portions of a cargo bed cover that are connected to each other;
securing the cover over the cargo bed;
securing at least one panel with the holder to the underside of each of the cover portions; and
removing the at least one panel from the cover to partition the cargo bed independent of the cover.

15. The method according to claim 14, wherein defining the holder comprises defining a snap-fit compartment on an underside of each of the at least two cover portions for the at least one panel.

16. The method according to claim 14, wherein defining the holder comprises defining a latch movable between a secured position holding the at least one panel to the underside of a corresponding one of each of the at least two cover portions and a non-secured position enabling removal of the at least one panel from the corresponding one of the at least two cover portions.

17. The method according to claim 14, including removing the panels from each of the at least two cover portions and securing the panels within the cargo bed independent of the at least two cover portions.

18. The method according to claim 15, including securing two panels across the cargo bed and another panel between the two panels disposed across the cargo bed.

* * * * *